April 14, 1970     E. V. HUDSON ETAL     3,506,478

METHOD OF BALANCING A BRAKE DRUM

Filed Aug. 29, 1968

INVENTORS
EUGENE V. HUDSON
JOHN F. MILLER
HAROLD C. RUSKA

ATTORNEY

United States Patent Office 3,506,478
Patented Apr. 14, 1970

3,506,478
METHOD OF BALANCING A BRAKE DRUM
Eugene V. Hudson, Detroit, John F. Miller, Fraser, and Harold C. Ruska, Warren, Mich., assignors to The Budd Company, Philadelphia, Pa., a corporation of Pennsylvania
Filed Aug. 29, 1968, Ser. No. 756,267
Int. Cl. C23c 7/00
U.S. Cl. 117—105                     3 Claims

ABSTRACT OF THE DISCLOSURE

A method of balancing a brake drum for a vehicle consisting of determining the point of unbalanced and the amount of weight required to balance the drum and then applying a sufficient amount of metal spray for the balancing of the drum.

---

This invention relates to a method for balancing a brake drum and more particularly to a method for applying a predetermined amount of metal spray to the periphery of a brake drum in a predetermined area to produce a balanced brake drum.

The current practice of balancing full cast or composite type brake drums consists of determining the point and amount of weight required to balance the drum and then arc or gas welding the weight on the drum head of the cast drums or projection welding a weight on the drum head of the composite type drum. Such placing of balance weights creates several problems in the handling of the balanced drums. By placing the balance weight on the outer portion of the drum head, the conventional palletizing of drums for shipment requires the drum be supported on the drum head surface or that the drum head surface support an upper layer of brake drums, in either method of stacking the balance weight causes uneven stacking and is often loosened or knocked off the drum head during shipment.

The novel method of metal spraying the required amount of metal to the outer periphery of the brake drum in the proper area to balance the drum eliminates the problems created by the balance weights during the handling of the balanced drums, eliminates the parts inventory of various balance weights, and provides maximum correction with a minimum amount of additional material.

The improved method of balancing brake drums consists of the steps of determining and marking on the drum the amount of correctional weight and the circumferential location required to provide a balanced brake drum. Applying metal sprayed material to the outer periphery of the brake drum in the amount and location marked thereon to correct the unbalance.

An object of this invention is to produce balanced brake drums by metal spraying the proper amount of metal to the drum periphery and eliminating balance weights and the welding thereof to the drum head.

This and other objects of the invention will become apparent by reference to the following specification and drawings wherein.

Figure 2:
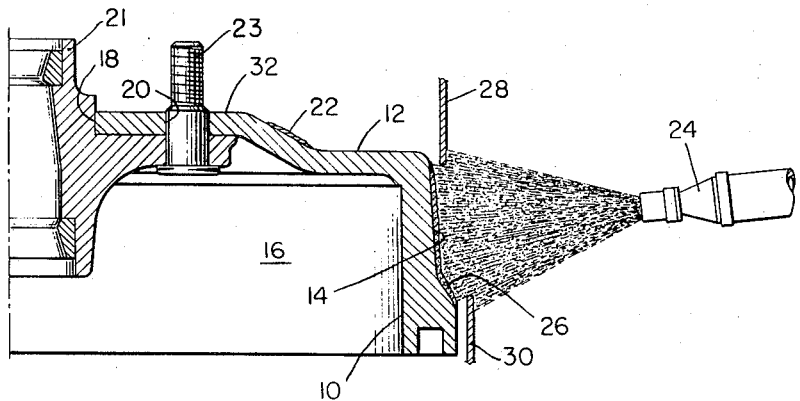
FIG. 2 is a view of FIG. 1, with portions broken away, substantially along line 2—2 in the direction of the arrows, showing the application of the metal spray material to the brake drum attached to the hub structure.
Figure 1:
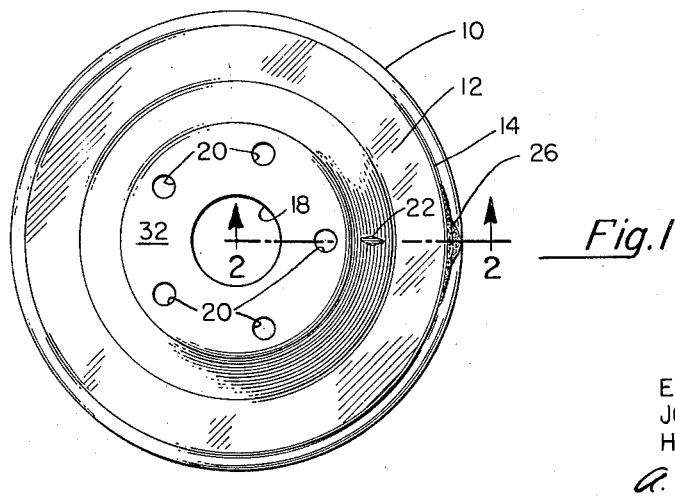
FIG. 1 is a plan view of a balanced vehicle brake drum illustrating the weight marking and metal sprayed balance material.

Referring now to the drawings, as best seen in FIGS. 1 and 2, a full cast vehicle brake drum 10 having a central drum head section 12 and an outer drum ring section 14 extending at substantially a right angle from the plane of the drum section. The inner surface of the drum ring provides a braking surface 16 for cooperating with the brake shoes (not shown) in a typical vehicle brake. A central aperture 18 is provided in the center of the drum head for positioning on a vehicle hub and a plurality of mounting holes 20 are spaced about the central aperture 18 in the drum head 12 for securing the drum to the hub structure.

Figure 3:
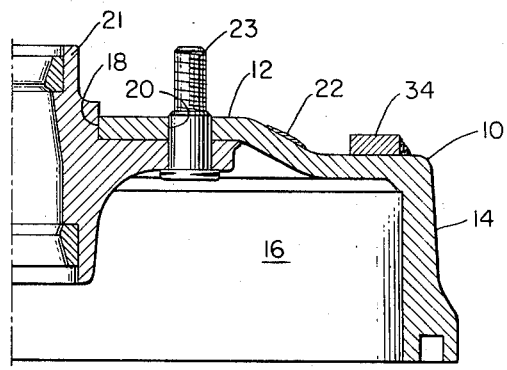
FIG. 3 and FIG. 3A are views of drum sections similar to FIG. 2 illustrating the prior art means of balancing brake drums.

Some brake drums 10, as seen in FIG. 1, are balanced and shipped without attaching a hub. Other brake drums, as seen in FIGS. 2 and 3, are staked to a hub 21 by a plurality of studs 23 and balanced and shipped as a unit. For ease of explanation, reference hereafter to a brake drum may be considered to be just a brake drum or a hub and brake drum joined.

The method for balancing the brake drum consists of placing the finished machined brake drum or hub and drum assembly on a conventional balance testing machine which indicates the point at which a weight should be placed to balance the wheel by placing a drop of paint 22 at the circumferential location. The color of the paint indicates the amount of corrective weight required. Up to this point, the prior art process and the present process are the same.

In the noved method of this invention, the balance tested brake drum 10 has the paint drop 22 aligned with a metal spray gun 24 which deposits a predetermined amount of metal spray 26, as indicated by the color of the paint drop 22, on the outer periphery of the drum ring section 14. Shields 28, 30 are positioned adjacent the brake drum 10 to prevent overspray from the metal spray gun being deposited on the braking surface 16 or the mounting surface 32 of the drum head 12, as seen in FIG. 2.

In the metal spray process, a metal wire is fed to an oxygen and acetylene flame that atomizes the wire form and sprays the molten metal on the adjacent surface being coated. The atomized metal solidifies on contact with a slight transfer of heat to the coated surface. The weight of the deposit is controlled by the wire feed rate, time cycle, size of wire and wire material.

Figure 3A:
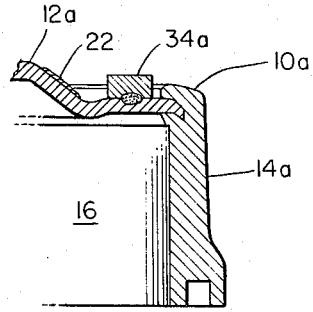

As seen in FIG. 3 and FIG. 3A, the old methods of balancing require a supply of various balance weights that were applied by arc welding the balance weight 34 to a full cast brake drum 10, as seen in FIG. 3, or projection welding a balance weight 34a to a composite brake drum 10a having a stamped drum head 12a and a cast drum ring section 14a. It can be seen that the novel method of this invention can be used on the full cast brake drum 10 or composite brake drum 10a to replace the welded balance weight, thus reducing the inventory requirements of various size and types of balance weights and eliminating the hand welding of the weight to the brake drum.

We claim:
1. A method for statically balancing a vehicle brake drum comprising the steps of:
 (1) placing finish machined brake drum on a balancing machine,
 (2) marking the brake drum at the circumferential point that weight is needed to balance the brake drum,
 (3) indicating the amount of weight required at the circumferential point for balacing the brake drum,
 (4) removing the brake drum from the balancing machine and positioning the brake drum before a metal spray gun with the circumferential point aligned with the metal spray gun,

(5) applying the indicated weight of metal from the metal spray gun to the brake drum for balancing the brake drum.

2. The method for balancing a vehicle brake drum as claimed in claim 1 wherein steps (2) and (3) are combined by placing a paint mark at the circumferential point for the balance weight and varying the color of the paint mark for indicating the amount of weight required.

3. The method for balancing a vehicle brake drum as claimed in claim 1 including the additional step of positioning shields between the metal spray gun and the brake drum before applying the metal to the brake drum for protecting the braking surface and mounting surface of the brake drum from the sprayed metal.

References Cited

UNITED STATES PATENTS

| | | | |
|---|---|---|---|
| 1,553,670 | 9/1925 | Cautley | 188—218 |
| 1,800,883 | 4/1931 | Booth. | |
| 1,943,641 | 1/1934 | Udale | 188—218 |
| 2,432,659 | 12/1947 | Criswell | 118—8 |
| 3,038,563 | 6/1962 | Boegehold. | |

FOREIGN PATENTS 768,711   5/1934   France.

GEORGE E. A. HALVOSA, Primary Examiner

U.S. Cl. X.R.

117—37, 105.4; 188—218; 74—573; 118—8